(12) United States Patent
Popovich

(10) Patent No.: US 7,009,970 B2
(45) Date of Patent: Mar. 7, 2006

(54) METHODS FOR MANAGING BANDWIDTH IN A PACKET-BASED COMMUNICATION SYSTEM INCORPORATING A RESERVATION PROXY FUNCTION

(75) Inventor: George Popovich, Palatine, IL (US)

(73) Assignee: Motorola, Inc., Schaumburg, IL (US)

( * ) Notice: Subject to any disclaimer, the term of this patent is extended or adjusted under 35 U.S.C. 154(b) by 967 days.

(21) Appl. No.: 09/891,645

(22) Filed: Jun. 26, 2001

(65) Prior Publication Data

US 2002/0197996 A1 Dec. 26, 2002

(51) Int. Cl.
H04L 12/28 (2006.01)
H04L 12/56 (2006.01)
(52) U.S. Cl. .................. 370/390; 370/432; 370/468
(58) Field of Classification Search ............ 370/468, 370/390, 432, 401, 230, 389, 338, 236, 322; 709/226–229, 238, 245
See application file for complete search history.

(56) References Cited

U.S. PATENT DOCUMENTS

| 6,058,113 | A * | 5/2000 | Chang ..................... 370/390 |
| 6,101,549 | A * | 8/2000 | Baugher et al. ........... 709/238 |
| 6,411,616 | B1 * | 6/2002 | Donahue et al. .......... 370/352 |
| 6,600,735 | B1 * | 7/2003 | Iwama et al. ............. 370/352 |
| 6,704,576 | B1 * | 3/2004 | Brachman et al. ........ 455/503 |
| 6,765,927 | B1 * | 7/2004 | Martin et al. ............. 370/469 |
| 6,791,980 | B1 * | 9/2004 | Li ............................ 370/390 |
| 6,791,981 | B1 * | 9/2004 | Novaes ..................... 370/390 |
| 6,854,013 | B1 * | 2/2005 | Cable et al. ............... 709/226 |
| 2002/0085506 | A1 * | 7/2002 | Hundscheidt et al. ...... 370/254 |
| 2002/0186694 | A1 * | 12/2002 | Mahajan et al. ........... 370/390 |

OTHER PUBLICATIONS

Braden, Ed, et al. Resource ReserVation Protocol (RSVP) Version 1 Functional Specification IETF RFC 2205 Sep. 1997 100 pages.

* cited by examiner

Primary Examiner—Ajit Patel
Assistant Examiner—Chirag Shah
(74) Attorney, Agent, or Firm—Indira Saladi; Terri S. Hughes; Steven R. Santema

(57) ABSTRACT

Methods for managing bandwidth in a packet-based communication system are disclosed wherein the packet-based communication system includes one or more reservation proxy elements associated with a plurality of zones. Specifically, the methods comprise receiving a call request for a talkgroup call and identifying a multicast group address for the call. Then, determining locations of one or more participating devices for the call, thereby determining a number of participating zones of the plurality of zones, the reservation proxy elements associated with the participating zones defining participating reservation proxy elements and communicating the multicast group address to the participating reservation proxy elements. Finally, the methods comprise receiving, from the participating reservation proxy elements, indicia of availability of communication resources on one or more links between the participating zones.

15 Claims, 4 Drawing Sheets

METHODS FOR MANAGING BANDWIDTH IN A PACKET-BASED COMMUNICATION SYSTEM INCORPORATING A RESERVATION PROXY FUNCTION

CROSS-REFERENCE TO RELATED APPLICATIONS

This invention is related to U.S. Patent Publication 20020067710 titled "Method for Managing Bandwidth in a Packet-Based Communication System" and U.S. Pat. No. 6,847,827, titled "Method for Managing Bandwidth in a Packet-Based Communication System Using Call Unit Reservations," assigned to the assignee of the present invention and incorporated herein by reference in their entirety.

FIELD OF THE INVENTION

This invention generally relates to packet-based communication systems and, in particular, to a method of managing bandwidth in a packet-based communication system using a reservation proxy function.

BACKGROUND OF THE INVENTION

Communication systems typically include a plurality of communication units, such as mobile or portable radio units, dispatch consoles and base stations (sometimes called base site repeaters) that are geographically distributed among various base sites and console sites. The radio units wirelessly communicate with the base stations and each other using radio frequency (RF) communication resources, and are often logically divided into various subgroups or talkgroups.

Communication systems are often organized as trunked systems, where the RF communication resources are allocated on a call-by-call basis among multiple users or groups. Wide-area trunked systems are sometimes organized into a plurality of "zones," wherein each zone includes multiple sites and a central controller or server ("zone controller") for allocating communication resources among the multiple sites. The zone controller(s) may reside within a single device or multiple devices and may be located at a fixed equipment site or may be distributed among various base sites. The RF resources may comprise, for example, narrow band frequency modulated channels, time division modulated slots, carrier frequencies, frequency pairs, or generally any medium for communicating information, such as voice, video, or data traffic ("payload information") or control signaling ("control information") to and from participating communication devices over wireless link(s).

Traditionally, the base sites and console sites were linked via a circuit-switched architecture, through dedicated or on-demand circuits to a central radio system switching point ("central switch"). The circuits providing connectivity to the central switch required a dedicated wire for each endpoint (e.g., base site or console site) whether or not the endpoint was participating in a particular call.

More recently, communication systems are beginning to use packet-switched technology where information that is to be communicated between endpoints is divided into packets and transported by various routers forming an Internet Protocol (IP) network. Packet-switched networks, sometimes called "connectionless" networks, are considered to be more efficient than circuit-switched networks because they allow for dynamic bandwidth allocation to participating devices on an as needed basis.

Due to the "connectionless" nature of packet-based networks, it is possible to over-subscribe certain links., including, but not limited to, inter-zone links that are leased by communication system customer(s). Generally, in any packet-based system, over-subscription of link(s) causes delays in transport of IP packets that adversely effect the quality of service of the network. Understandably, customers demand a certain quality of service and are more willing to occasionally queue (or "busy") inter-zone calls due to insufficient resources than to pay extra recurring costs to over-provision these links to accommodate peak traffic loads. The problem is exacerbated in very large systems that may include hundreds of zones and hundreds of inter-zone links. Accordingly, there is a need for a method of call control in a packet-based communication system that provides for establishing calls over shared links of an IP network without exceeding available bandwidth.

One manner of addressing these needs is described in related U.S. Pat. No. 6,847,827, wherein reservations of bandwidth are statically established (i.e., pre-determined) for certain links by a first host device (e.g., zone controller) on behalf of at least a second host device (e.g., base station) that may require use of bandwidth. The reservations of call units are established using standard ReSerVation Setup Protocol (RSVP) signaling, prior to receiving any call requests, using multicast group address(es) that are never used for actual calls. If the zone controller receives a call request, it grants the request if there are sufficient reserved call units to support the call, in which case it forwards a different multicast address (i.e., different from the address (es) used to make the reservations) to participating endpoints and the call may proceed using that multicast address.

The present application provides an alternative manner of addressing the stated needs, whereby reservations of bandwidth for certain links are established dynamically (on a call-by-call basis) by host device(s) incorporating a reservation proxy function. The method provides for the host devices (hereinafter "reservation proxy elements") to obtain reservations of call units using RSVP signaling using multicast group address(es) that are used for actual calls. Advantageously, the method may provide for limiting the scope of RSVP signaling to inter-zone links to minimize signal delays and the consumption of site bandwidth.

BRIEF DESCRIPTION OF THE DRAWINGS

The foregoing and other advantages of the invention will become apparent upon reading the following detailed description and upon reference to the drawings in which.

DESCRIPTION OF PREFERRED EMBODIMENTS

Figure 1:
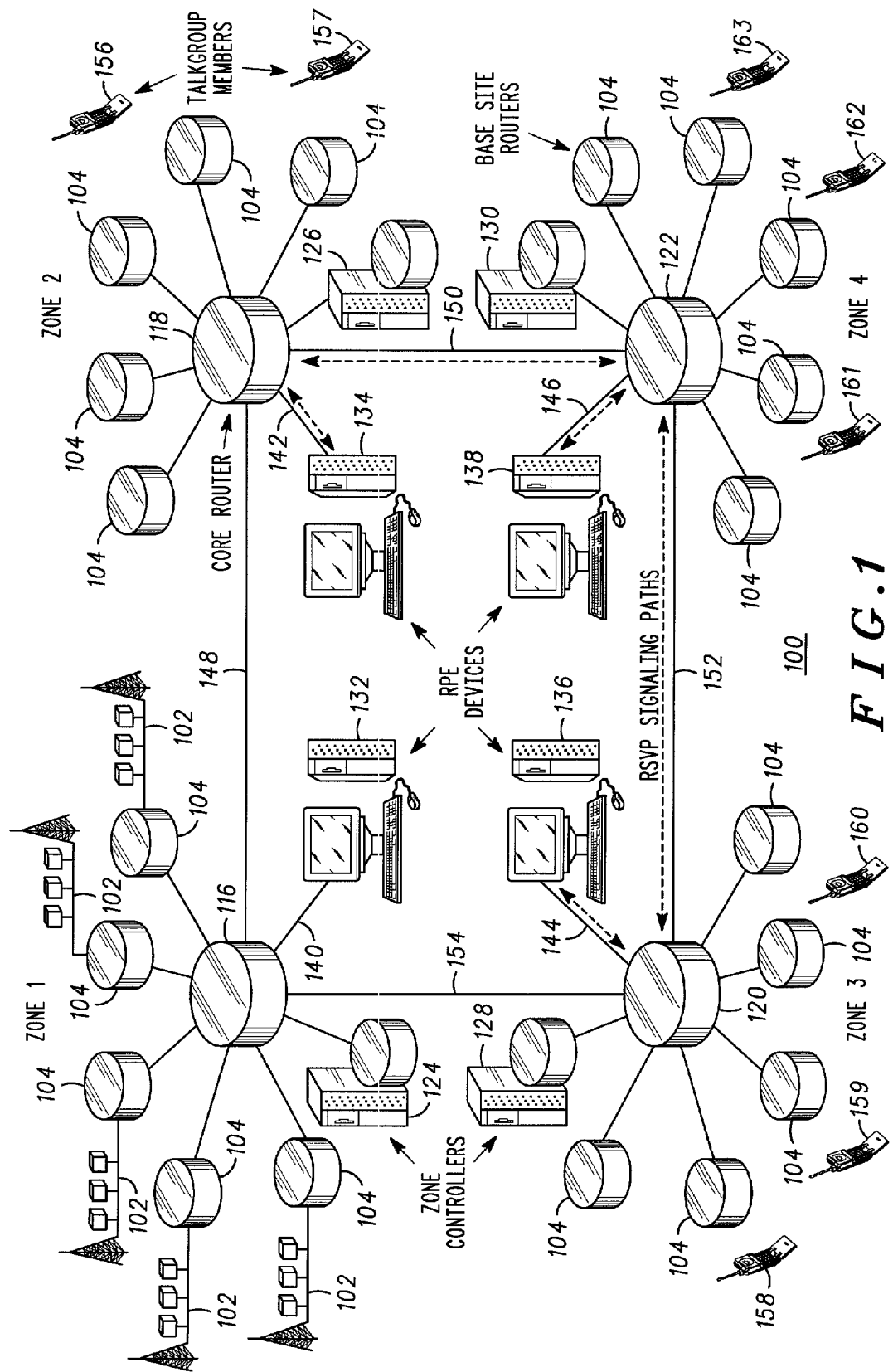
FIG. 1 shows a multi-zone packet-based communication system incorporating reservation proxy elements according to one embodiment of the invention.

FIG. 1 shows by way of example and not limitation, a packet-based communication system 100 comprising a plurality of base sites 102 organized into a plurality of zones ("Zone 1" through "Zone 4"). For convenience, the base sites 102 are shown only at Zone 1, although it will be understood that base sites are also at Zones 2, 3 and 4. The base sites 102 include base stations 106 for communicating via RF resources with wireless communication units (e.g., communication units 156–163) within their respective coverage areas, which communication units may roam from site to site and from zone to zone.

The base sites 102 are logically coupled, via router elements 104 ("base site routers") to router elements 116, 118, 120, 122 ("core routers") associated with their respective zones. The core routers are logically connected via packet network (inter-zone) links 148, 150, 152, 154. The core routers 116, 118, 120, 122 are connected to respective zone controllers 124, 126, 128, 130 that perform call processing and mobility management functions for communication units within their respective zones.

The base site routers 104 and the core routers 116, 118, 120, 122 are functional elements that may be embodied in separate physical devices or combinations of such devices, which devices comprise specialized or general purpose computing devices configured to receive IP packets from a particular host in the communication system 100 and relay the packets to another router or another host in the communication system 100. Packets may be distributed between zones using sparse mode routing protocols such as the Core Based Tree (CBT) protocol and the Protocol Independent Multicast-Sparse Mode (PIM-SM) protocol, dense mode routing protocols such as the Distance Vector Multicast Routing Protocol (DVMRP), Protocol Independent Multicast-Dense Mode (PIM-DM) and the Multicast Open Shortest Path First (MOSPF) protocol, or virtually any other protocol suitable for transporting packets between hosts of the communication system 100.

As will be appreciated, the communication system 100 may also include communication units such as consoles or infrastructure devices (not shown) including, for example, dispatch consoles, call loggers, site controller(s), comparator(s), telephone interconnect device(s), internet protocol telephony device(s), scanner(s) or gateway(s) for communicating with the communication units 156–163, base sites 102, base site routers 104, core routers 116, 118, 120, 122, zone controllers 124, 126, 128, 130 or generally any communication device in the communication system 100. These devices are typically wireline devices, i.e., connected by wireline to the base site(s) or other infrastructure device(s) but may also be implemented as wireless devices.

According to one aspect of the present invention, the communication system 100 includes a plurality of reservation proxy elements ("RPEs") 132, 134, 136, 138 associated with the respective zones 1–4. The RPEs are functional elements that may be embodied in separate physical devices or combinations of such devices. In one embodiment, for example, the RPEs are incorporated within one or more of the zone controllers 124, 126, 128, 130. Alternatively, the RPEs may be incorporated within console(s), call logger(s) and/or other infrastructure device(s) that may be included within the communication system 100. In one embodiment, as will be described in greater detail in relation to FIG. 2 and FIG. 3, the RPEs use RSVP signaling to dynamically obtain reservations of bandwidth on one or more of the inter-zone links 148, 150, 152, 154 for a prospective call.

In one embodiment, the base stations 106, base site routers 104, core routers 116, 118, 120, 122, zone controllers 124, 126, 128, 130 and RPEs 132, 134, 136, 138 of the communication system 100, as well as any consoles or wireline devices that may be included the communication system 100 comprise IP host devices that are able to send and receive IP packets or datagrams between other host devices of the network. Recent advances in technology have also extended IP host functionality to wireless communication units, in which case the wireless communication units 156–163 may comprise host devices as defined herein. Each host device has a unique IP address. The host devices include respective processors (which may comprise, for example, microprocessors, microcontrollers, digital signal processors or combination of such devices) and memory (which may comprise, for example, volatile or non-volatile digital storage devices or combination of such devices).

Figure 2:
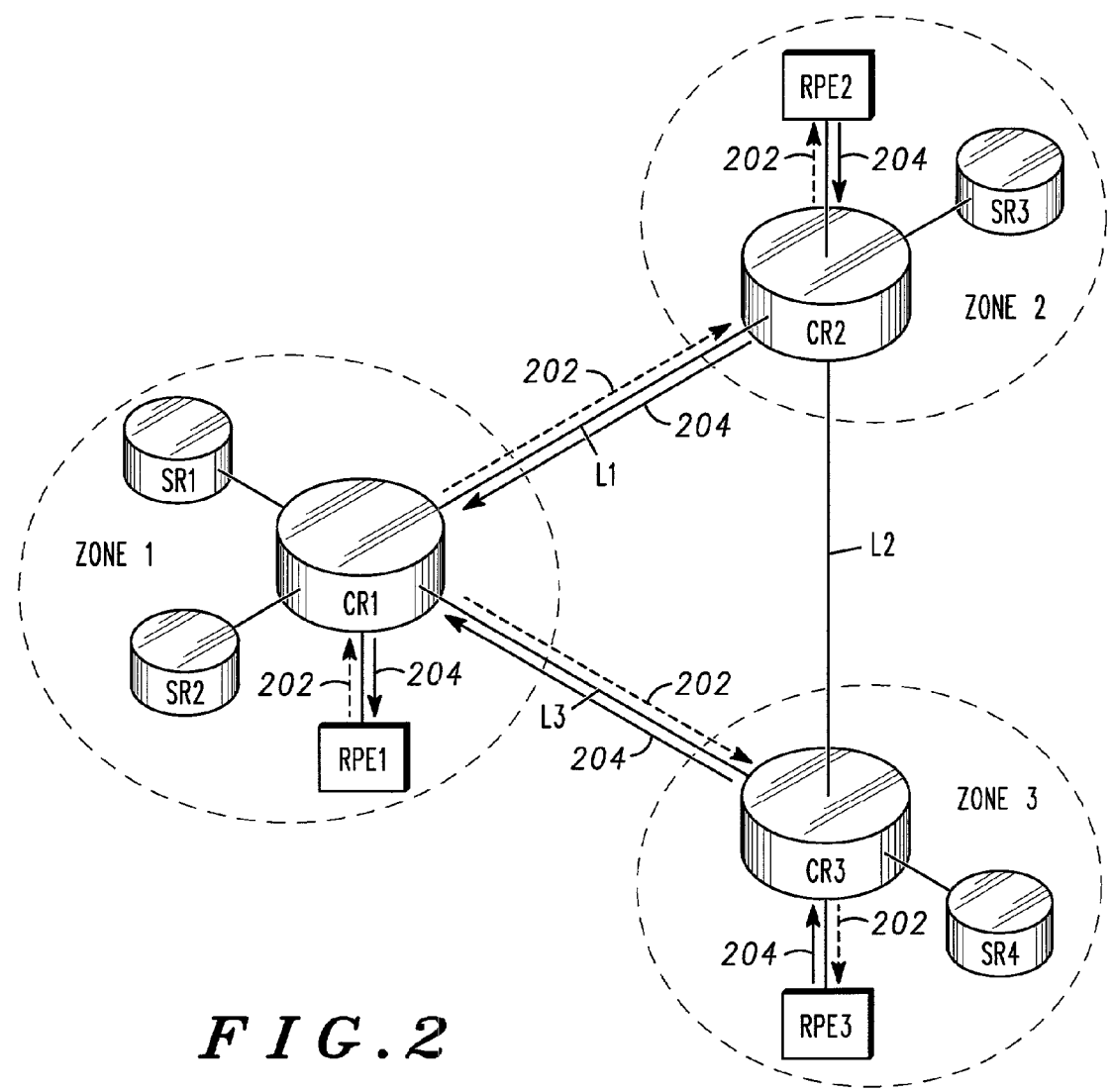
FIG. 2 is a block diagram useful for illustrating an RSVP message sequence between reservation proxy elements and routers of a multi-zone packet-based communication system.

Turning now to FIG. 2, there is shown a simplified packet-based communication system 200 useful for showing an RSVP message sequence between RPEs (e.g., RPE 1, RPE 2, RPE 3) in multiple zones (e.g. Zones 1–3) connected by packet network inter-zone links (e.g., L1, L2, L3). In one embodiment of the present invention, an RSVP message sequence is used to dynamically obtain reservations of bandwidth on one or more inter-zone links (e.g., L1, L3), as will be described in greater detail in relation to FIG. 3. The RSVP protocol itself is described in detail in IETF RFC 2205, incorporated herein by reference.

As shown in FIG. 2, the RSVP message sequence is initiated by sourcing RPE 1 sending an RSVP "path" message 202 its associated core router CR1. In one embodiment, the path message 202 is addressed to a multicast group address that is to be used for a prospective communication. The routers of the network forward the path message 202 to participating RPEs (e.g., RPE 2 and RPE 3) having joined the multicast address. Thus, in the present example, the path message 202 is routed across the link L1 to core router CR2 and across link L3 to core router CR3. In turn, CR2 and CR3 send the path message to RPE 2 and RPE 3.

Upon receiving the path messaged, RPE 2 and RPE 3 send RSVP "reserve" messages 204 back to RPE 1, which reserve messages essentially retrace the path as the path messages but in a reverse direction. Thus, in the present example, the reserve messages 204 are sent from RPE 2 to CR2 and from RPE 3 to CR3, then from CR2 to CR1 across the link L1 and from CR3 to CR1 across the link L3 and finally from CR1 to RPE 1. RPE 2 and RPE 3 receive confirmation from the network once the reservation is established. Thereafter, in one embodiment, the RPEs inform their associated zone controllers (not shown in FIG. 2) that bandwidth is available for a prospective call. Having been informed of resource availability, the zone controller(s) may set up the call between participating devices as will be described in FIG. 4.

According to RSVP protocols, three types of reserve messages may be used: Wildcard Filter (WF), Shared Explicit (SE) or Fixed Filter (FF), each of which will result in a specific type of data flow behavior as follows:

The WF style allows the same resource reservation to be shared by multiple senders. Valid senders are not specified in the reservation. In effect, the reservation provides a shared pipe, whose size is determined by the largest reservation in the session, independent of the number and identity of the senders. Thus, for example, a reservation of bandwidth on link L1 using the WF style would allow for any sending host (e.g., site router SR1 or SR2) to use the reservation without RPE 2 having specified SR1 or SR2 in the reservation.

The SE style is similar to WF, except the receiver is allowed to specify which hosts are to be included in the reservation. Thus, for example, SR1 and SR2 might be specified as eligible senders by RPE 2 using the SE style of reserve message. The SE style assumes multiple hosts will not send simultaneously. Thus, in the present example, the SE style of reservation might reserve a single call unit of bandwidth on link L1 which is eligible for use by either SR1 or SR2, but not SR1 and SR2 simultaneously.

The FF style creates distinct reservations for each sender in the session. Individual senders are specified in the reservation request message. Thus, for example, if SR1, SR2 are specified as eligible senders by RPE 2, , the FF style of reservation might reserve two call units of bandwidth on link L1, i.e., one call unit of bandwidth for each of SRI, SR2, thereby allowing simultaneous use of link L1 by both SR1 and SR2.

Figure 3:
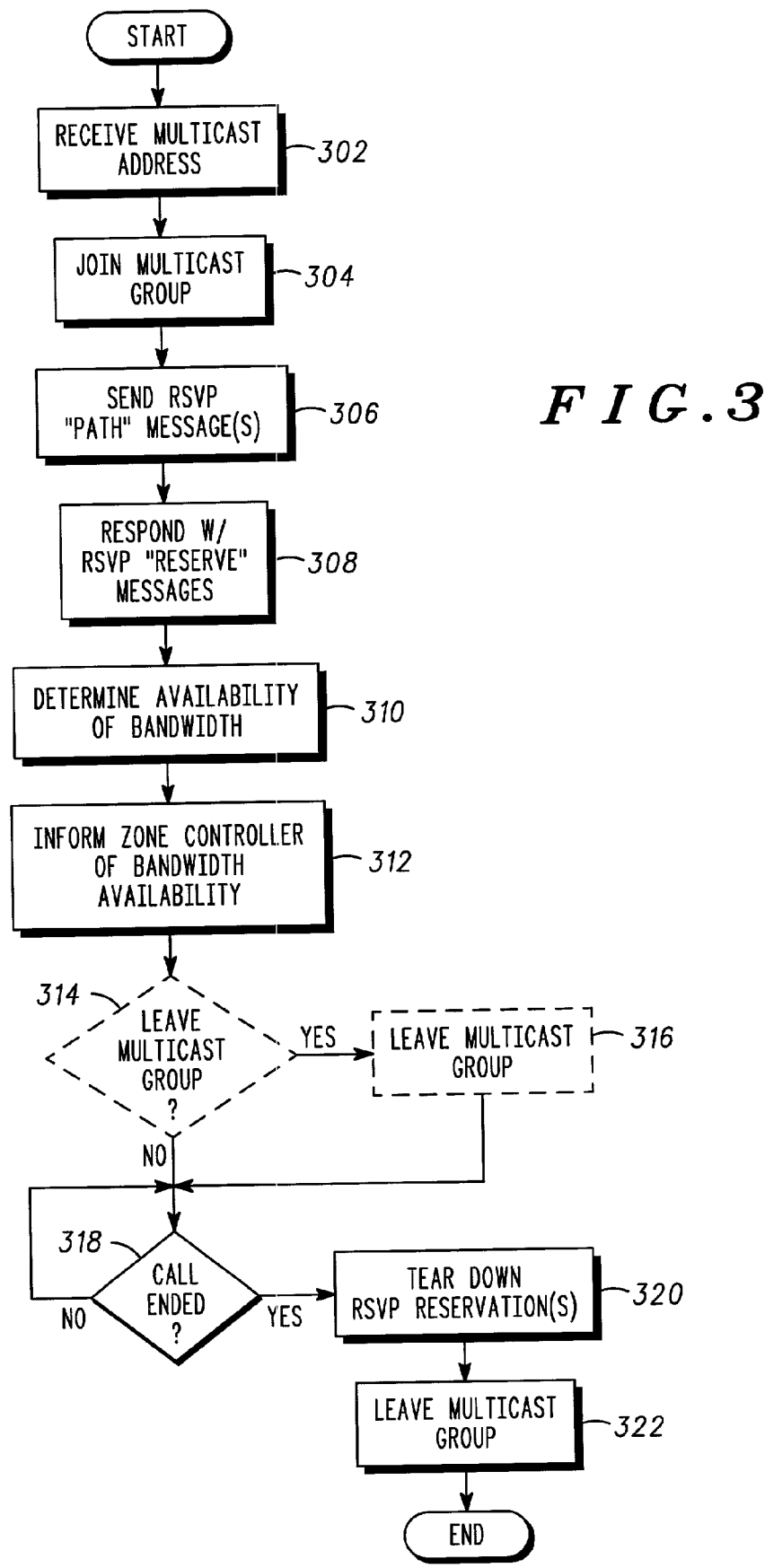
FIG. 3 is a flowchart showing steps performed by reservation proxy element(s) to set up a prospective multicast call according to one embodiment of the invention.

FIG. 3 shows steps performed by participating RPEs to set up a prospective multicast call according to one embodiment of the invention. In one embodiment, the participating RPEs are those RPEs associated with zones that will participate in the call. For example, with reference to FIG. 1, if the prospective call is to be a talkgroup call involving communication units 156–157 (zone 2), 158–160 (zone 3) and 161–163 (zone 4), the participating RPEs comprise RPE 134 (zone 2), RPE 136 (zone 3) and RPE 138 (zone 4).

At step 302, the participating RPEs (e.g., RPEs 134, 136, 138) receive a multicast group address associated with the call. In one embodiment, the multicast group address is communicated to the participating RPEs from a zone controller (e.g., zone controller 128) having received the call request and assigned the multicast group address for the prospective call, prior to granting the call request.

At step 304, the participating RPEs join the multicast group address, in one embodiment by sending IGMP Join messages to their attached core router. Thus, in the present example, RPEs 134, 136, 138 send IGMP Join message to respective core routers 118, 120, 122. Upon joining the multicast group address, the participating RPEs are able to receive control messages (e.g., RSVP signaling messages) that are addressed to the multicast group address.

After a predetermined settling time, each RPE sends at step 306 an RSVP path message or other suitable control message destined to the multicast group address received at step 306. Upon reception of a path message, each RPE sends at step 308 an RSVP reserve message that essentially retraces the path of the received path message. The reserve message may incorporate the Wildcard Filter, Shared Explicit or Fixed Filter RSVP protocols, as described in relation to FIG. 2. In one embodiment, each reserve message requests confirmation from the network once the reservation is established.

In the preferred embodiment, each participating RPE sends both path messages and reserve messages so as to establish two reservations on the affected inter-zone links—one in each direction. Thus, new reservations do not need to be established when the sourcing site changes from one zone to another during the call.

At step 310, the RPE(s) determine an availability of communication resources (e.g., bandwidth) on the inter-zone links based on receiving (or not receiving) confirmation from the network that the appropriate reservation(s) are established for the prospective call. According to RSVP protocols, the receiving hosts (i.e., those sourcing RSVP reserve messages) request confirmation from the network as to the RSVP reservation availability. In the preferred embodiment, each participating RPE acts as a receiving host, thus each participating RPE receives confirmation from the network as to the availability of bandwidth on its requested link reservation(s). The RPE(s) notify their local zone controller(s), which in turn notify the controlling zone controller of the availability (or non-availability) of bandwidth for the prospective call at step 312.

Optionally, at step 314, the RPEs determine whether to leave the multicast group. This is because the multicast group joined by the RPEs to receive control traffic to obtain a reservation of bandwidth for the prospective call is the same multicast group that will be used to receive payload (e.g., audio, video, etc.) once the prospective call is granted, thereby becoming an active call. RPEs may wish to leave the multicast group if they do not desire to receive payload for the active call. In the event any RPE desires to leave the multicast group address, it does so at step 316.

At step 318, the RPEs determine whether the call is ended. Typically, this determination is made upon receiving a message from a zone controller so indicating that the call has ended. If so, the RPEs tear down the RSVP reservations at step 320 so as to free up bandwidth on the inter-zone links for subsequent calls. If the RPEs are still joined to the multicast group address when the call is ended, they leave the multicast group at step 322.

Figure 4:
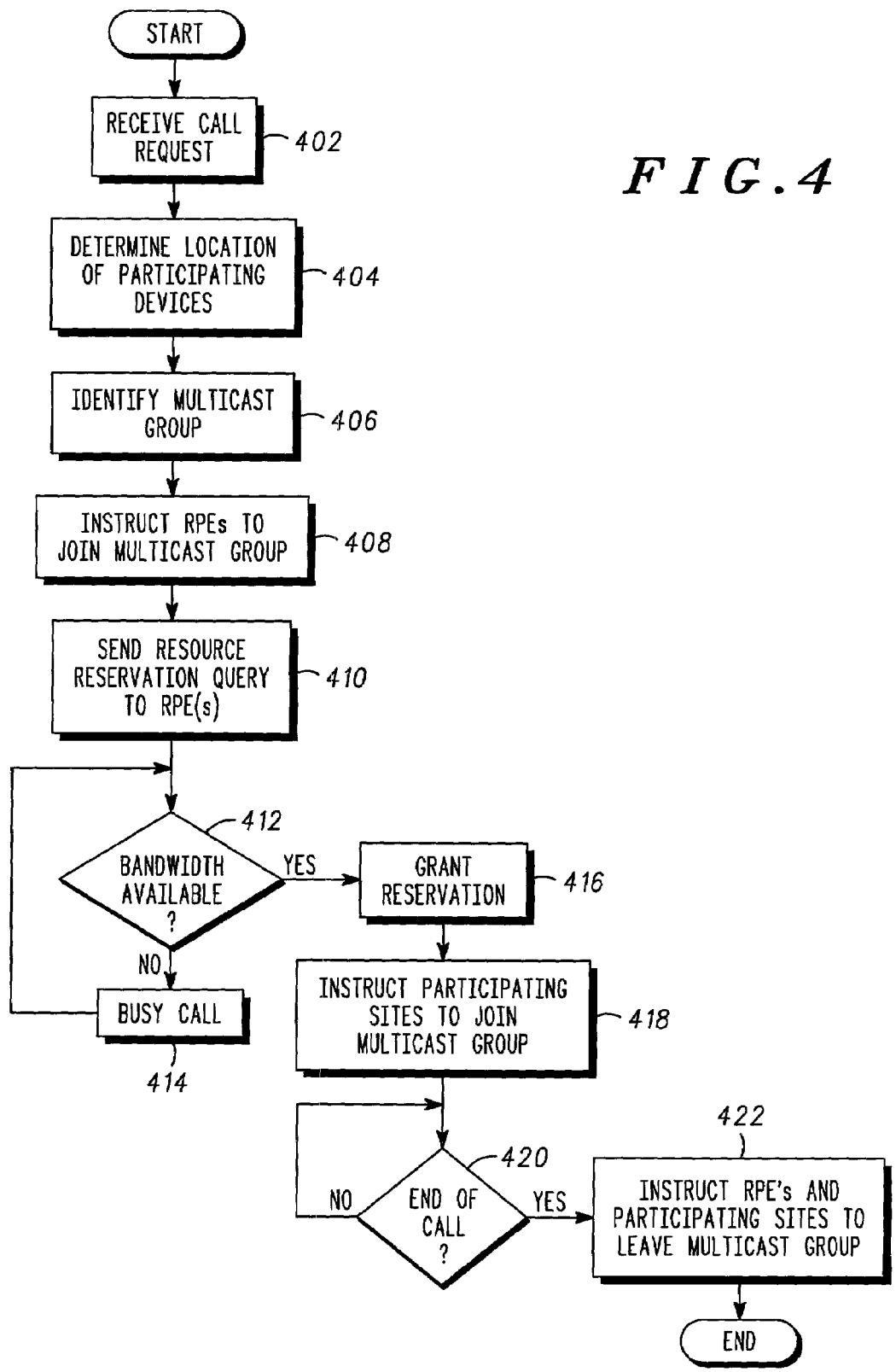
FIG. 4 is a flowchart showing steps performed by a zone controller to implement a multicast call according to one embodiment of the invention.

FIG. 4 shows steps performed by a zone controller to set up a prospective multicast call according to one embodiment of the invention. In one embodiment, the zone controller is a "controlling zone controller" or "CZC" for the communication system. The CZC may be statically configured from among a plurality of zone controllers in the communication system. Alternatively, the CZC may be defined on a call by call basis.

At step 402, the CZC receives a call request, for example, for a talkgroup call. The call request may be received, for example, from a wireless communication device, such as a mobile or portable radio, wireline communication device, console (wireless or wireline), base station, site controller, comparator, telephone interconnect device or internet protocol telephony device; or, in the case where the call request is sourced from a zone other than that of the CZC, the call request may be forwarded to the CZC from a zone controller associated with the sourcing zone. For example, with reference to FIG. 1, controller 128 (zone 3) may receive a call request from communication unit 158, via base site 102. If zone controller 128 is not the CZC, it forwards the call request to the CZC at step 402.

Upon receiving the call request, the CZC determines at step 404 the locations of participating devices for the prospective call, and hence which zones (and RPEs) are required to participate in the prospective call. For example, with reference to FIG. 1, if the prospective call is to be a talkgroup call involving communication units 156–163, zones 2, 3, 4 and RPEs 134, 136, 138 are required to participate in the prospective call.

At step 406, the CZC identifies a multicast group address for the prospective call. In one embodiment, the multicast group address comprises an address that is to be used for exchanging control messages (e.g., RSVP signaling) between participating RPEs during call set-up, as described in relation to FIG. 3, and also to be used for communicating payload information between participating devices when the call is granted. In a preferred embodiment, the CZC identifies the multicast group address dynamically, on a call-by-call basis. Alternatively, static multicast group addresses associated with various talkgroup IDs may be stored in memory and then recalled upon receiving a call request, as appropriate.

At step 408, the CZC sends the multicast group address to the participating RPEs, which in effect instructs the RPEs to join the multicast group address. In response, the RPEs join the multicast group address and attempt to obtain reservation of bandwidth to support the prospective call, as has been described in relation to FIG. 3.

At step 410, the CZC sends a Resource Reservation Query to the RPEs. In one embodiment, this is accomplished by the CZC sending the query directly to the RPE in its own zone and indirectly to RPEs in other zones, the latter being accomplished by sending the query to the zone controllers in other participating zones, which zone controllers forward the query to the RPEs in their respective zones.

At step 412, the CZC determines whether bandwidth is available to support the call, based on the responses of the RPEs to the Resource Reservation Query messages (as may be forwarded to the CZC from other participating zone controllers). If all participating zone controllers have responded and indicated the availability of the necessary resources, the CZC grants the call at step 416, by sending a call grant message to participating zone controllers. Otherwise, if the CZC determines that bandwidth is not available to support the call (based on the responses or lack of responses of the RPEs to the Resource Reservation Query messages), the CZC busies the call at step 414 until such time as resources become available to support the call.

In one embodiment, the call grant messages issued by the CZC at step 416 include the same multicast group address that is sent to the RPEs at step 408. Alternatively, the multicast group address may be passed to the participating zone controllers before issuing call grant messages. For example, the multicast group address may be provided to the participating zone controllers at generally the same time as they are provided to the participating RPEs at step 408.

In either case, at step 418, upon receiving the call grant message from the CZC, the participating zone controllers forward call grant messages including the multicast group address to participating devices in their respective zones. In effect, this instructs the participating devices to join the multicast group address so that they may receive payload for the active call. When the call ends (step 420), the CZC instructs the participating devices for the call to leave the multicast group address at step 422.

The present disclosure therefore identifies methods of call set-up and control in a packet-based communication system that rely upon reservation proxy elements (RPEs) establishing reservations of bandwidth over inter-zone links, which reservations may be used by participating devices for active calls. Advantageously, the reservations are established on a call-by-call basis using RSVP signaling addressed to a multicast group address that is also used for the active calls. The RSVP signaling by RPEs, rather than participating endpoints, reduces call set-up time and improves scalability of the communication system. Further, by eliminating the requirement for participating endpoints to perform any RSVP signaling, the consumption of precious site link bandwidth is reduced.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

What is claimed is:

1. In a communication system including one or more reservation proxy elements associated with a plurality of zones, a method comprising:
   receiving a call request for a talkgroup call;
   identifying a multicast group address for the call;
   determining locations of one or more participating devices for the call, thereby determining a number of participating zones of the plurality of zones, the reservation proxy elements associated with the participating zones defining participating reservation proxy elements;
   communicating the multicast group address to the participating reservation proxy elements; and
   receiving, from the participating reservation proxy elements, indicia of availability of communication resources on one or more links between the participating zones.

2. The method of claim 1, wherein the reservation proxy elements are incorporated within one or more controllers of the communication system.

3. The method of claim 1, wherein one or more reservation messages includes the multicast group address for the call.

4. The method of claim 1, further comprising exchanging one or more control messages between the reservation proxy elements, wherein the reservation proxy elements are associated with one or more participating hosts logically connected by at least one packer network link, and wherein the step of exchanging further comprises:
   sending, from a sourcing reservation proxy element of the one or more reservation proxy elements, a first control message across the packet network link, the first control message being addressed to the multicast group address;
   receiving, by one or more receiving reservation proxy elements having joined the multicast group address, the first control message; and
   sending, by the receiving reservation proxy elements responsive to the first control message, respective second control messages across the packet network link.

5. The method of claim 4, wherein the first control message comprises an RSVP path message and the second control messages comprise RSVP reserve messages.

6. The method of claim 5, wherein the RSVP path messages include a wildcard filter protocol, allowing for the reservation of communication resources on the packet network link to be used by an unspecified host of the participating hosts.

7. The method of claim 5, wherein the RSVP path messages include a shared explicit protocol, allowing for the reservation of communication resources on the packer network link to be used by any one of a plurality of specified hosts of the participating hosts.

8. The method of claim 5, wherein the RSVP path messages include a fixed filter protocol, allowing for the reservation of communication resources on the packet network link to be used by each one of a plurality of specified hosts of the participating hosts.

9. The method of claim 4, wherein the at least one packet network link comprises an inter-zone link.

10. The method of claim 1, further comprising:
    granting the call request in response to a positive determination of availability; and instructing the participating devices to join the multicast group address.

11. The method of claim 1, further comprising busying the call request in response to a negative determination of availability.

12. The method of claim 1, performed by one or more controllers of the communication system.

13. The method of claim 12, wherein the one or more controllers comprise communication resource controllers incorporating the one or more reservation proxy elements.

14. The method of claim 1, further comprising determining indicia of availability of communication resources on a call-by-call basis.

15. The method of claim 1, further comprising instructing the reservation proxy elements to leave the multicast group address upon determining indicia of availability of communication resources on one or more links between the participating zones.

* * * * *

UNITED STATES PATENT AND TRADEMARK OFFICE
CERTIFICATE OF CORRECTION

PATENT NO. : 7,009,970 B2 Page 1 of 1
APPLICATION NO. : 09/891645
DATED : March 7, 2006
INVENTOR(S) : Popovich It is certified that error appears in the above-identified patent and that said Letters Patent is hereby corrected as shown below:

Column 8, line 31, change "packer," to --packet--

Column 8, line 54, change "packer", to --packet--

Signed and Sealed this

Twenty-first Day of November, 2006

JON W. DUDAS
*Director of the United States Patent and Trademark Office*